United States Patent
Kumagai

(10) Patent No.: US 8,028,888 B2
(45) Date of Patent: Oct. 4, 2011

(54) METHOD OF JOINING TOGETHER END PORTIONS OF SUPERPOSED MEMBERS

(75) Inventor: Masaki Kumagai, Nagoya (JP)

(73) Assignee: Sumitomo Light Metal Industries, Ltd., Minato-Ku (JP)

( * ) Notice: Subject to any disclaimer, the term of this patent is extended or adjusted under 35 U.S.C. 154(b) by 297 days.

(21) Appl. No.: 11/442,468

(22) Filed: May 25, 2006

(65) Prior Publication Data

US 2006/0278325 A1    Dec. 14, 2006

(30) Foreign Application Priority Data

Jun. 9, 2005    (JP) ................. 2005-169276

(51) Int. Cl.
*B23K 20/12*    (2006.01)
(52) U.S. Cl. ............... 228/112.1; 228/113; 228/2.1
(58) Field of Classification Search ............... 228/112.1, 228/113, 2.1
See application file for complete search history.

(56) References Cited

U.S. PATENT DOCUMENTS

| | | | |
|---|---|---|---|
| 5,460,317 A | 10/1995 | Thomas et al. | |
| 6,302,315 B1 * | 10/2001 | Thompson | 228/112.1 |
| 6,686,052 B2 * | 2/2004 | Jogan et al. | 428/472.2 |
| 2003/0028281 A1 * | 2/2003 | Adams et al. | 700/212 |
| 2004/0035914 A1 * | 2/2004 | Hempstead | 228/112.1 |
| 2004/0046003 A1 * | 3/2004 | Vyas | 228/112.1 |
| 2005/0029330 A1 | 2/2005 | Kohn | |

FOREIGN PATENT DOCUMENTS

| | | |
|---|---|---|
| DE | 197 46 308 A1 | 4/1999 |
| EP | 1 236 533 A1 | 9/2002 |
| GB | 1 385 473 | 2/1975 |
| JP | 2000-042760 A1 | 2/2000 |
| JP | 2000-158154 | 6/2000 |
| JP | 2000-317654 | 11/2000 |
| JP | 2001-518848 A1 | 10/2001 |
| JP | 2004-174575 A1 | 6/2004 |
| WO | 98/45080 A1 | 10/1998 |

OTHER PUBLICATIONS

Random House Dictionary; www.dictionary.com; "substantially".*
Random House Dictionary; www.dictionary.com; "superposed".*

* cited by examiner

*Primary Examiner* — Jessica L Ward
*Assistant Examiner* — Erin Saad
(74) *Attorney, Agent, or Firm* — Burr & Brown

(57) ABSTRACT

A method of joining a plurality of members to be joined together, by piling the plurality of members on one another and joining together the members with one another at end portions of superposed parts of the members, wherein the superposed parts of the members are held by restraining the superposed parts from both sides thereof, while a pressing tool, which is harder than the members, is pressed to end faces of the superposed parts and the pressing tool is rotated and/or moved relative to the superposed parts, so that the end faces of the superposed parts are rubbed to cause a friction heating which leads to cause a plastic flow, whereby the plurality of the members are joined together at the end portions of the superposed parts thereof.

10 Claims, 6 Drawing Sheets

METHOD OF JOINING TOGETHER END PORTIONS OF SUPERPOSED MEMBERS

This application claims the benefit of Japanese Patent Application No. 2005-169276 filed on Jun. 9, 2005, the entirety of which is incorporated herein by reference.

BACKGROUND OF THE INVENTION

1. Field of the Invention

The present invention relates to a useful method of joining together end portions of superposed members. In particular, the present invention relates to a method of joining together superposed members, in which a plurality of members to be joined together are piled on one another and the members are joined together with one another at the end portions thereof.

2. Discussion of Related Art

There have been methods of joining together a plurality of members to be joined together with one another, at the end portions thereof, as forms of joining together superposed parts of the plurality of members, and these methods are known as butt-joint, edge-welding, and so on.

There is generally considered adopting a fusion welding, in which an arc or a laser is used, in order to join together the end portions of the superposed parts. However, in this case, there is an inherent problem of causing a joint defect caused by a void etc., in addition to an adverse influence to the other sections of the members caused by the welding. Moreover, if a thickness of the superposed parts of the members to be joined together isn't thick enough, there is caused a problem of burn-through. Therefore, it has been difficult to obtain an advantageous and sound joint structure.

Unlike a method of joining which involves a generation of a large amount of heat (energy) such as the above-mentioned fusion welding, there is also known a friction stir welding, in which a friction heating is generated between two members to be joined together. In the method of the friction stir welding: the members to be joined together are held in abutting contact with end faces of each other; a rotary tool is pressed to the abutting end faces of the members while the rotary tool is rotated relative to the members; and the members are subjected to a pressure weld making use of the friction heating generated at the interface between the members and the rotary tool. Accordingly, the rotary tool needs to be rotated while the members to be joined together are held in butting contact with each other, and therefore, it is impossible to join together the above-mentioned superposed parts of the plurality of members at the end portions thereof. Moreover, when this method of fusion welding is applied, it is difficult to avoid generating largely curled burrs, so that a shape or an appearance of the joint portion is unsatisfactory.

The present invention has been made in the light of the situations described above. It is therefore an object of the invention to provide a novel method that enables to effectively join together end portions of superposed parts of members to be joined together, without adopting a fusion welding method. It is also an object of the invention to provide a method that enables to easily and stably join together the end portions of the superposed parts of the members, even if the superposed parts are thin.

The object indicated above may be achieved according to a principle of the present invention, which provides a method of joining a plurality of members to be joined together, by piling the plurality of members on one another and joining together the members with one another at end portions of superposed parts of the members, characterized in that the superposed parts of the members are held by restraining the superposed parts from both sides thereof, while a pressing tool, which is harder than the members, is pressed to end faces, which are some sections of the end portions, of the superposed parts and the pressing tool is rotated and/or moved relative to the superposed parts, so that the end faces of the superposed parts are rubbed to cause a friction heating which leads to a plastic flow, whereby the plurality of the members are joined together at the end portions of the superposed parts thereof.

In the method of joining together the end portions of the superposed members according to the present invention, the superposed parts of the members are held by restraining the superposed parts from both sides thereof, while a pressing tool, which is harder than the members, is pressed to the end faces of the superposed parts and the pressing tool is rotated and/or moved relative to the superposed parts, so that the end faces of the superposed parts are rubbed to cause a friction heating which results in softening the end portions which leads to a plastic flow, whereby the plurality of the members are effectively joined together under solid phase at the end portions of the superposed parts thereof According to the present method, problems resulting from the fusion welding are wholly solved, and an effective joining at the intended end portions or end surface layer is realized.

In addition, in the method according to the present invention, there is only required an operation of relatively rotating/moving the pressing tool, while the pressing tool is pressed to the end faces of the superposed parts. Accordingly, there can be simplified a structure of a joining device, without requiring expensive welding devices or auxiliary machines etc., and there can also be simplified joining operations. Accordingly, in addition to the simplification of the joining operation, there can be advantageously distributed to reduce a cost of the welding.

In order to achieve the above-mentioned objects and other objects recognized by overall the description of this specification and the attached drawings, the present invention is preferably practiced in at least the following features. The present invention may also be embodied by suitably combining the undermentioned features. It is to be understood that the embodiments and the technical features of the present invention are not limited to the followings, but may be recognized based on the overall description of this specification and the inventions disclosed in the attached drawings.

FEATURES OF THE INVENTION

The present invention is preferably practiced in at least the following features.

(1) A method of joining a plurality of members to be joined together, by piling the plurality of members on one another and joining together the members with one another at end portions of superposed parts of the members, characterized in that the superposed parts of the members are held by restraining the superposed parts from both sides thereof, while a pressing tool which is harder than the members, is pressed to end faces of the superposed parts and the pressing tool is rotated and/or moved relative to the superposed parts, so that the end faces of the superposed parts are rubbed to cause a friction heating which leads to a plastic flow, whereby the plurality of the members are joined together at the end portions of the superposed parts thereof.

(2) The method according to the above feature (1), wherein the pressing tool has a pressing pin to be rotated on its axis, and the pressing pin is rotated, while a tip of the pressing pin is pressed to the end faces of the superposed parts and the pressing pin is relatively moved in a direction in which the end faces of the superposed parts extend.

(3) The method according to the above feature (1),
wherein the pressing tool has a pressure roller to be rotated on its axis, and
the pressure roller is rotated, while a circumference of the pressure roller is pressed to the end faces of the superposed parts and the pressure roller is relatively moved in a direction in which the end faces of the superposed parts extend.

(4) The method according to the above feature (1),
wherein the pressing tool has a pressing spatula,
the pressing spatula is pressed to the end faces of the superposed parts, while the pressing tool is rotated and/or moved relative to the superposed parts, so as to join together the end portions of the superposed parts.

(5) The method according to any one of the above features (1)-(4),
wherein the superposed parts are restrained by being sandwiched between joining jigs in a direction, in which the superposed parts are piled on one another, while the superposed parts are projected from both sides of the joining jigs, and the members are joined together at the end portions of the projected superposed parts.

If the joining operation of the projected end portions by the pressing tool is implemented, while the superposed parts of the plurality of the members to be joined together are projected from both sides of the joining jigs, according to the above-described feature, there can be advantageously prevented the pressing tool from being caused to contact or interfere with the fixing jigs.

(6) The method according to any one of the above features (1)-(5),
wherein at least one first groove is provided on a contacting surface of the pressing tool,
the contacting surface is opposed to the end faces of the superposed parts, so that the at least one groove is located on a position corresponding to at least one interface between the superposed parts, extending along the end faces.

If the pressing tool has the groove located on the position which is on the contacting surface thereof and corresponding to the interface between the superposed parts, the material which has flowed because of the plastic flow that enters the groove. Accordingly, it is possible to effectively reduce the amount of the material, which is discharged to the outside of the end portions as burrs.

(7) The method according to any one of the above features (1)-(6),
wherein a second groove, which has an opening, whose width is larger than a thickness of the superposed parts, is provided on the contacting surface of the pressing tool,
the contacting surface is opposed to the end faces of the superposed parts, so that the second groove is extending along the end faces, and
the end portions of the superposed parts are accommodated in the groove, whereby the friction heating is caused.

Owing to the presence of the groove provided on the surface of the pressing tool, the end portions of the superposed parts are accommodated and heated by the friction heating. Accordingly, the occurrences of the burrs are more effectively restrained, without making a gap between the superposed parts.

(8) The method according to any one of the features (1)-(7),
wherein the thickness of the superposed parts of the members to be joined together is not more than 3 mm.

The present invention is advantageously adopted to join together the superposed parts, which is as thin as stated above, so that the end portions of the superposed parts can be effectively joined together.

(9) The method according to any one of the features (1)-(8),
wherein the thickness of the superposed parts of the members to be joined together is not more than 1 mm.

If the thickness of the superposed parts is not more than 1 mm, it is generally difficult to join together the end portions of the superposed parts. However, according to the method of the present invention, the end portions of the members to be joined together can be advantageously joined together, even if the thickness of the members is as thin as stated above.

(10) The method according to any one of the above features (1)-(9),
wherein the end faces of the superposed parts is preheated, before the end faces are caused to contact with the pressing tool.

By preheating the end portions of the superposed parts according to the present invention, the plastic flow caused by the friction heating can be more effectively conducted, whereby the end portions can be joined together at a high speed.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIGS. 1A and 1B are schematic transverse cross-sectional views showing one example of a method of joining together end portions of superposed parts according to the present invention, wherein FIG. 1A is a cross-sectional view of the members before joining together at the end portions thereof and FIG. 1B is a cross-sectional view of the superposed parts during joining together at the end portions thereof, respectively;

FIGS. 2A and 2B are schematic views showing another example of a method of joining together end portions of superposed parts according to the present invention, wherein FIG. 2A is a transverse cross-sectional view of the superposed parts before joining together at end portions thereof and FIG. 2B is a top view of the superposed parts during joining together at the end portions thereof, respectively;

FIG. 3A is a side explanatory view in which the pressure roller is rotated in a reverse direction relative to a direction of movement of the pressure roller, and FIG. 3B is a side explanatory view in which the pressure roller is rotated in a direction of movement of the pressure roller;

FIGS. 5A-5D are cross-sectional explanatory views showing a variety of states of pressing tool to be butted to end portions of superposed portions according to the present invention, wherein FIGS. 5A-5D are cross-sectional views showing different forms of circumferential surfaces of pressure rollers and apical surfaces of pressing spatulas, respectively.

DETAILED DESCRIPTION OF THE PREFERRED EMBODIMENTS

Hereinafter, there will be described in detail preferred embodiments of the present invention by reference to the drawings.

Figure 1A:
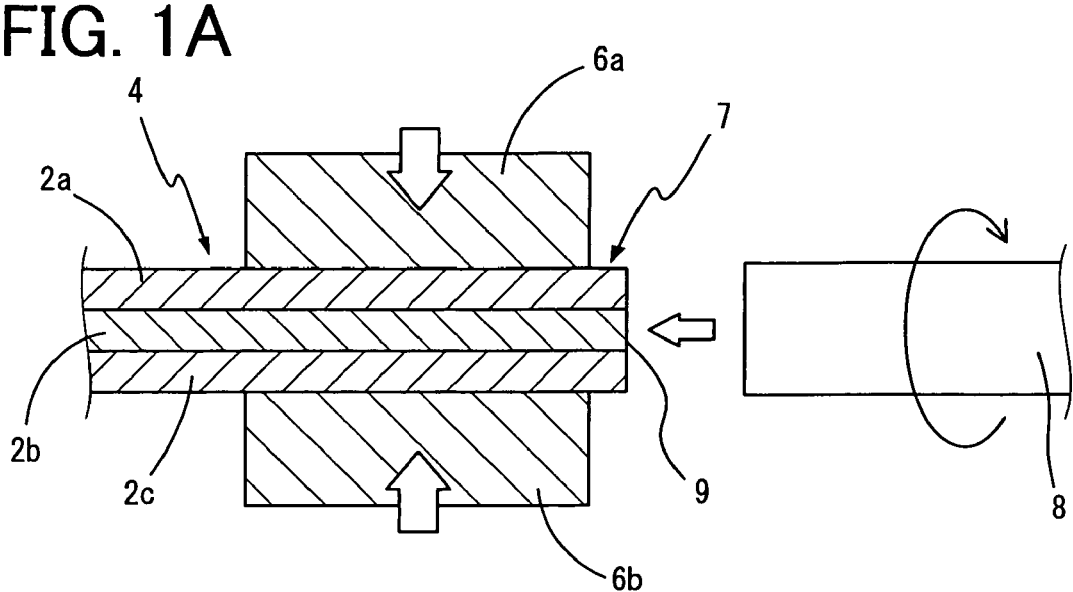
Figure 1B:
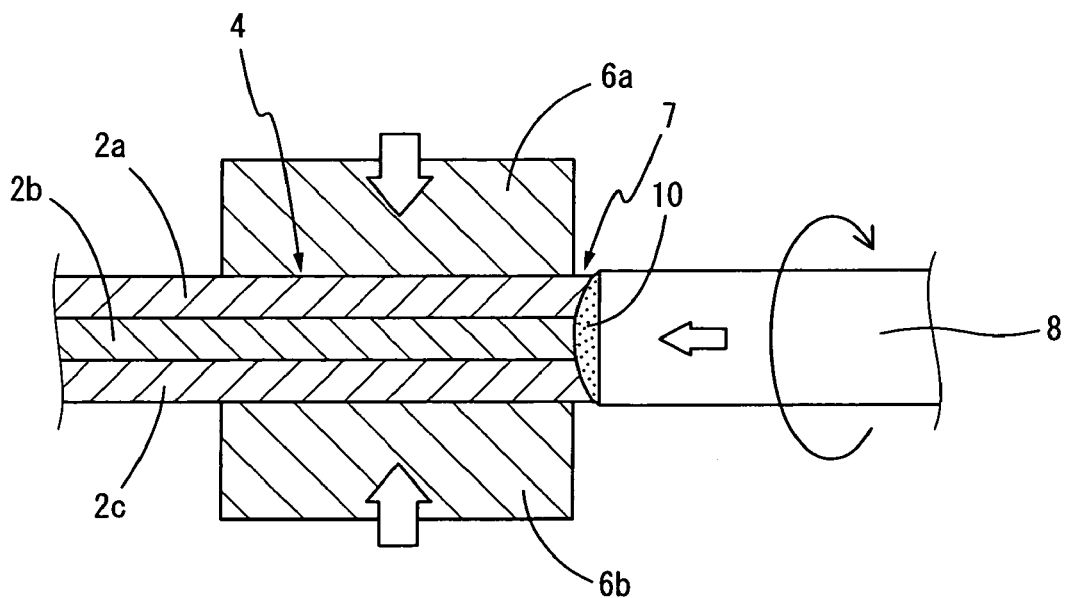

Referring first to FIGS. 1A and 1B, there are schematically shown appearances of superposed parts before and during the joining operation to join together end portions 7 thereof according to one embodiment of the present invention. Numerals 2a, 2b, and 2c shown in these figures are metal plates to be joined together. In these figures, the three plates 2a, 2b and 2c are superposed on one another at the superposed parts 4, while the superposed parts 4 are restrained by being sandwiched between joining jigs from both sides of a direction, in which the superposed parts are superposed on one another, whereby the superposed parts 4 can be held and fixed to a certain position. Meanwhile, an apical surface of a round-bar shaped pressing pin 8 as a pressing tool, which can be rotated at a high speed on its axis, is positioned to oppose to end portions 7 of the superposed parts 4. The pressing pin 8 can be moved in an axial direction thereof and pressed to the end faces 9 of the superposed parts 4. The pressing pin 8 is harder than the metal plates 2a-2c.

As shown in FIG. 1A, in the method of joining together the end portions according to the present invention, the pressing pin 8 as the pressing tool is moved forward, while being rotated at a high speed on its axis. The apical surface of the pressing pin 8 is butted to the end portions 7, which are some sections of the end portions of the superposed parts 4, and is further pressed to the superposed parts 4, so that the end portions 7 of the superposed parts are rubbed to cause a friction heating which leads to cause a plastic flow. Accordingly, as shown in FIG. 1B, there is formed weld region 10 on a surface of the end portions 7 of the superposed parts 4, whereby the plurality of metal plates 2a, 2b, and 2c are joined together at the end portions 7 of the superposed parts 4. Further, by moving the pressing pin 8 relative to the superposed parts 4, along a direction in which the end portions 7 of the superposed parts 4 extend, there is realized jointing together overall (full length of) the end portions 7 of the superposed parts 4.

Also, in one embodiment shown in FIGS. 1A and 1B, a predetermined length of the end portions 7 of the superposed parts 4 is projected out of the fixing jigs 6a and 6b, whereby there is effectively avoided causing the pressing pin 8 to contact or interfere with the fixing jigs 6a and 6b. In addition to this, there is also exhibited a characteristic that the projected superposed parts are stirred more easily. The length of the projected portions of the superposed parts 4 is suitably determined, and is generally sufficient if the length of the projected portions is up to about 1-2 mm.

In the operation of joining together the end portions according to the present invention as described above, there can be used metal plates made of a variety of metal materials as the metal plates 2a-2c. There are especially advantageously used relatively soft metal plates which are made of a material, such as an aluminum, an aluminum alloy, a copper, a copper alloy, or a combination of any of these materials. The present invention is especially advantageously adopted, if a thickness of each of the metal plates 2a, 2b, and 2c is not more than 1 mm, and a thickness of the superposed parts 4 of the metal plates 2a, 2b, and 2c (total thickness of the metal plates 2a, 2b, and 2c) is not more than 3 mm, whereby the characteristics of the present invention are more advantageously exhibited.

Figure 2A:
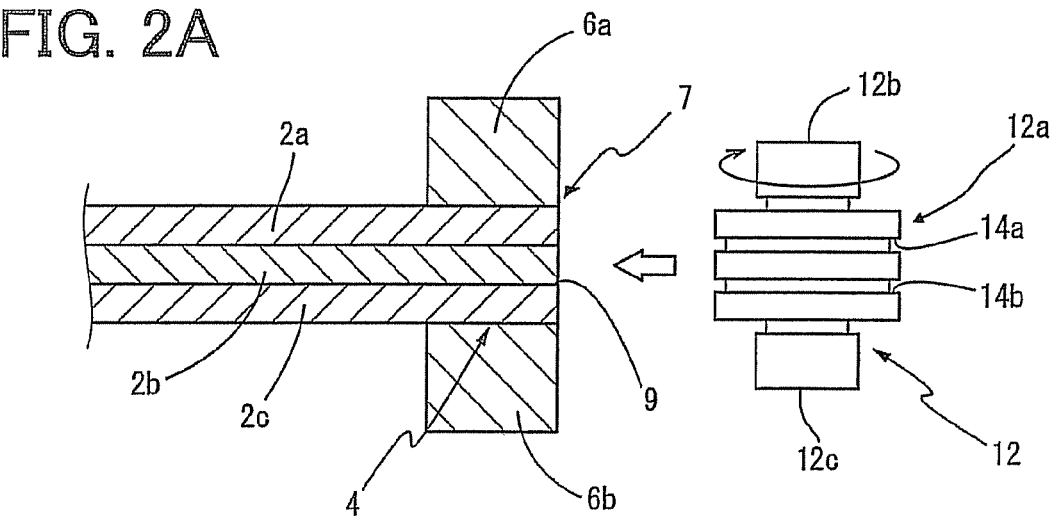
Figure 2B:
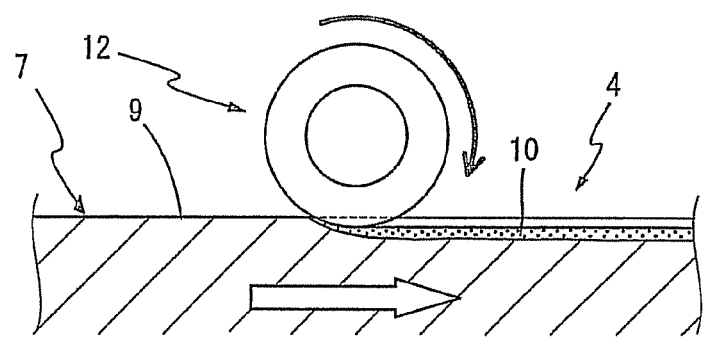

In FIGS. 2A and 2B, there are also shown another embodiment of joining together the end portions according to the present invention, wherein the pressing tool has a pressure roller 12, which is to be rotated in its axial direction and is harder than the metal plates 2a-2c. The pressure roller 12 is rotated at a high speed on its axis, while a circumferential surface thereof is pressed to the end faces 9 of the superposed parts 4 of the metal plates 2a-2c. Accordingly, there is caused a friction heating. Subsequently, there is also caused a plastic flow, so that there is formed a weld region 10 on surfaces of the end portions 7 of the superposed parts 4. Further, as shown in FIG. 2B, by moving the pressure roller 12 relative to the superposed parts 4, along a direction in which the end portions 7 of the superposed parts 4 extend, the end portions 7 of the superposed parts 4 are joined together.

In the pressure roller 12 shown in FIG. 2, two first grooves 14a, 14b are provided on a circumferential surface (roller surface) of the pressure roller 12, in a circumferential direction, which circumferential surface is to be butted and pressed to the end faces 9 of the superposed parts 4. The first grooves 14a, 14b are provided, so as to be located on positions corresponding to interfaces between the metal plates 2a and 2b, and between 2b and 2c, respectively, and to extend along the direction of joints of the plates (interfaces between the superposed parts at the end portions of the plates). According to this configuration, the materials, which are softened which leads to cause the plastic flow, are accommodated in the first grooves 14a, 14b, thereby preventing the materials from being discharged to the exterior of the plates as burrs. FIG. 2A also shows that the circumference of the pressure roller 12 that is pressed against the terminal edges of the superposed members defines a central contacting portion 12a of the tool, and the tool also includes two shoulder extremity portions 12b, 12c that extends directly from opposite axial ends of the central contacting portion 12a of the tool 12.

Also, as shown in FIG. 2B, a rotating direction of the pressure roller 12 is opposite to a direction of movement of the pressure roller 12 relative to the superposed parts 4, whereby more advantageous friction heating can be easily generated.

Figure 3A:
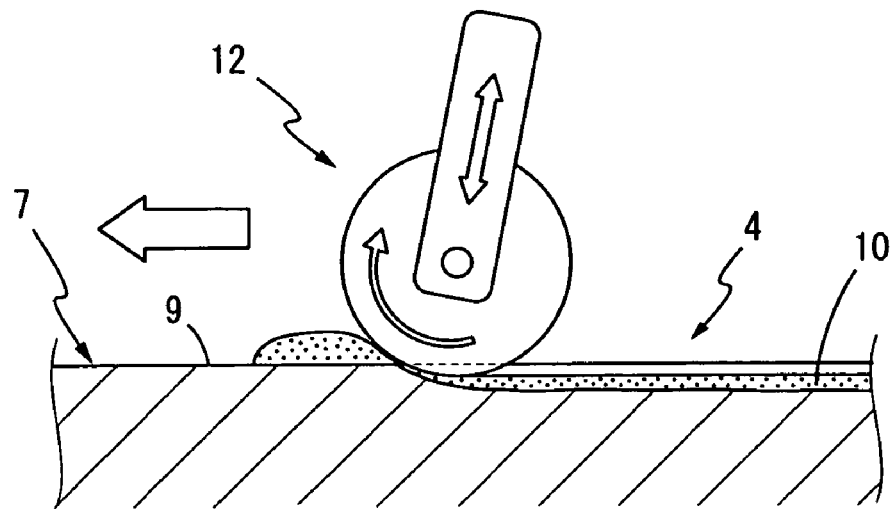
FIGS. 3A and 3B show examples of methods according to the present invention, in which rotating directions of the pressure rollers are different from each other.
Figure 3B:
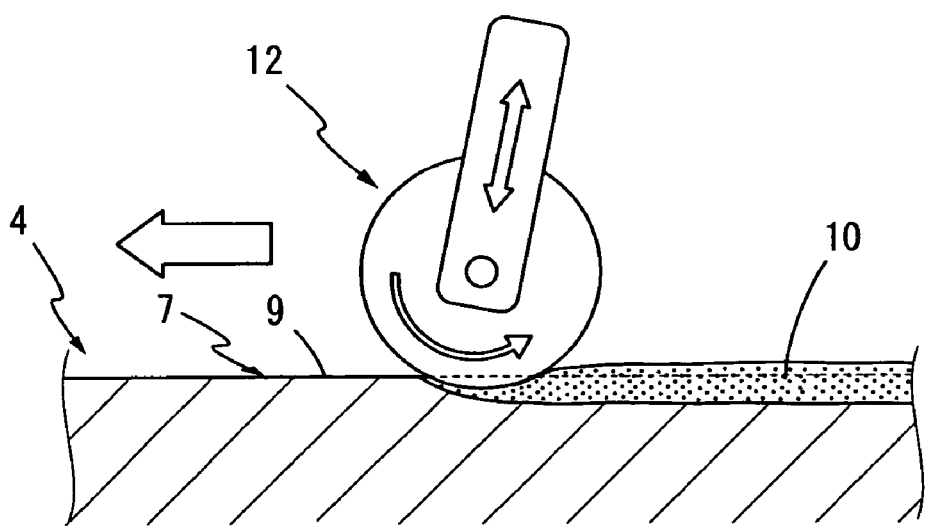

Meanwhile, in FIGS. 3A and 3B, there are schematically shown embodiments, which are different from each other in terms of rotating directions of the pressure rollers relative to a direction of movement of the superposed parts 4 of the metal plates 2a-2c, as base materials to be joined together, and the pressure roller 12. In FIG. 3A, similar to FIGS. 2A, 2B, the pressure roller 12, rotated in a reverse direction relative to the relative direction of movement of the base materials, is pressed to the end faces 9 of the superposed parts 4, whereby the materials (base materials) which are flown because of the plastic flow are ejected ahead of the pressure roller 12. In this case, the amount of the ejected base materials can be limited to a minimum amount, by balancing the relative speed of movement of the base materials and the rotating speed of the roller. On the other hand, in FIG. 3B, the pressure roller 12 is rotated in a forward direction relative to the relative direction of movement of the base materials, whereby the roller 12 is pressed to the end faces 9 of the superposed parts 4. In this case, the materials (base materials) which are flown because of the plastic flow are ejected behind the pressure roller 12, so that there can be advantageously adopted a feature of locating a suitable bracing jig to hold down the ejected base materials. In this case, the relative speed of movement of the base materials and the pressure roller 12 are different from each other, whereby a frictional effect is generated at the interface therebetween, which causes a friction heating.

Figure 4:
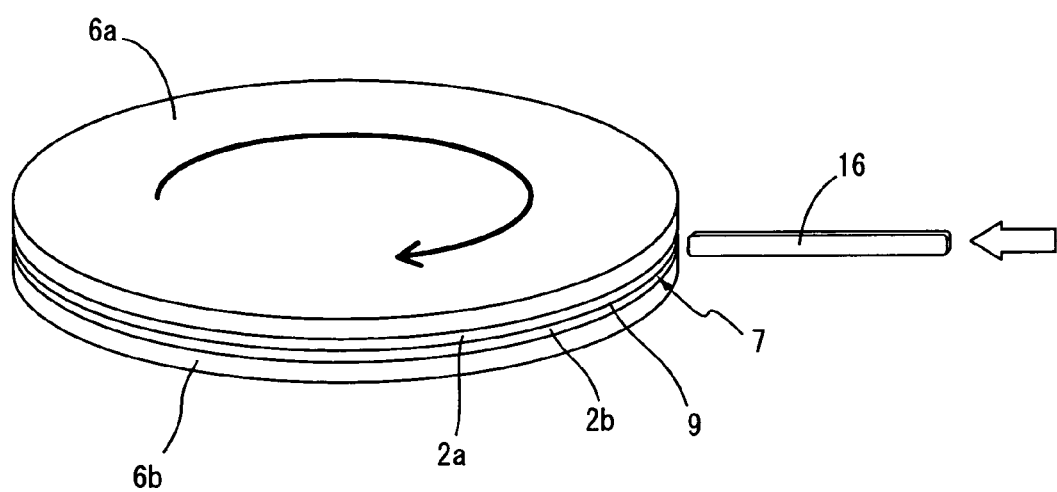
FIG. 4 is an explanatory view showing another example of a method of joining together end portions of superposed parts according to the present invention.

Moreover, in another embodiment of joining together the end portions according to the present invention shown in FIG. 4, two metal plates 2a, 2b, which are formed to be a discoid shape, are piled on each other, and a joining operation by using a pressing spatula is executed to the end portions of the superposed parts of the metal plates 2a, 2b.

In detail, the discoid shaped metal plates 2a, 2b are piled on each other, and the metal plates 2a, 2b can be rotated at a high speed having the center of its discoid shape as the center of the rotation, while the metal plates 2a, 2b are held and restrained by being sandwiched between fixing jigs 6a, 6b, each of which also has a discoid shape. Meanwhile, an apical surface of a plate shaped pressing spatula 16 which is harder than the metal plates 2a, 2b is pressed to the end faces 9 of the piled metal plates 2a, 2b, which are being rotated at a high speed, in a way that the apical surface of the pressing spatula 16 is caused to contact with end portions 7 (end faces 9) of both of the metal plates 2a, 2b. According to this arrangement, there is possible to cause a plastic flow on surfaces of the end portions 7 of the two metal plates 2a, 2b because of a friction heating, and to joint together overall the circumference of the discoid shape of the two metal plates.

In the present invention, there are suitably selected shapes of the circumferential surface of the above described pressure roller 12, which is caused to contact (abut) with and pressed to the end faces 9 of the superposed parts 4, and the shapes shown in FIGS. 5A-5D are especially advantageously adopted.

In FIGS. 5A-5D, each of a width (a length in its axial direction) of the pressure roller 12 and a width of an apical surface of the pressing spatula 16 (a width of an end surface of the pressing spatula 16 to be butted to the end portions 7 of the superposed parts 4) is substantially the same or larger than the width of the end portions 7 of the superposed portion 4. In another embodiment in FIG. 5A, a cross-sectional surface of the circumferential surface of the roller or the apical surface of the pressing spatula has a trapezoidal shape, and can be pressed to the end faces 9 of the superposed portion 4. According to this arrangement, a contact area between the end portions and the pressing tool can be enlarged, which leads to merits that a friction heating can be advantageously caused, and the central portion of the end portions is the most easily be stirred. In embodiments of FIGS. 5B and 5C, there are provided first grooves 14a, 14b, which are located on positions corresponding to interfaces between the metal plates 2a and 2b and between the metal plates 2b and 2c, respectively, extending along the direction in which the end portions 7 of the superposed parts 4 are joined together and/or a direction of relative rotation/movement of the end portions. According to this configuration, there is exhibited a characteristic that the materials, which are softened and flown because of the plastic flow, are effectively accommodated in the first grooves 14a, 14b, and are restricted or prevented from being discharged exterior of the plates, whereby a generation of burrs is effectively restrained.

Figure 5A:
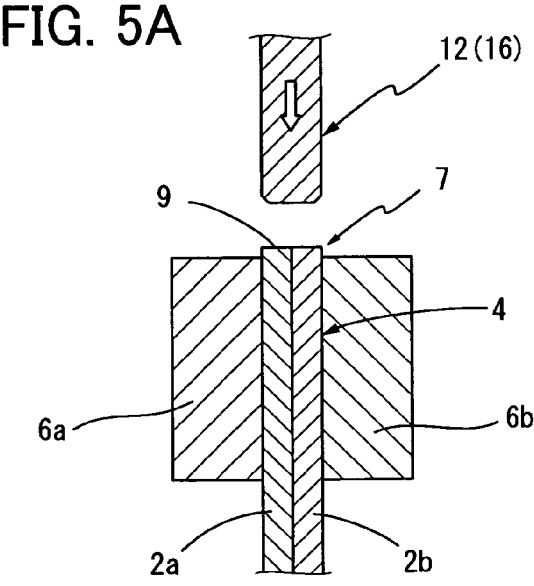
Figure 5B:
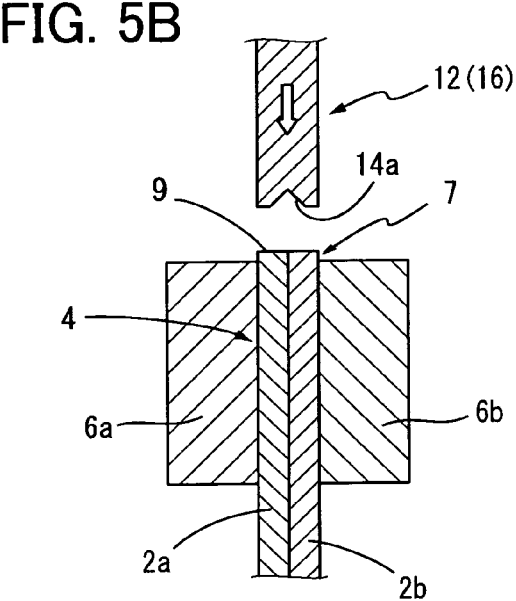
Figure 5C:
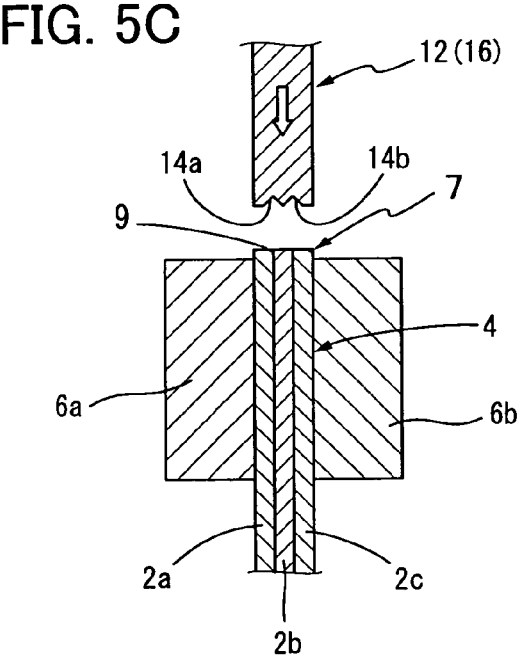
Figure 5D:
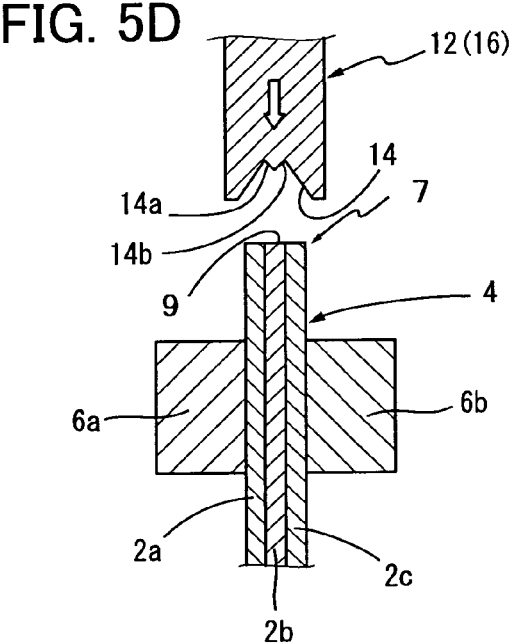

In another embodiment in FIG. 5D, there is a characteristic that the first grooves 14a and 14b together form a second groove 14, which is larger than the first groove. The second groove 14 is, as it is apparent from the figure, formed to have an opening whose width is larger than the thickness of the superposed parts 4. The end portions 7 of the superposed parts 4 are accommodated in the second groove 14, and heated by the friction heating, so that the generation of the burrs can be minimized, whereby there can be obtained a healthy state of welding. By the arrangement of the second groove 14 having the wide opening, if there are spaces in the interfaces between the metal plates 2a-2c at the end portions 7 of the superposed parts 4, the end portions 7 can be automatically restrained by the second groove 14, without leaving any gap between the end portions, and there can be effectively caused the friction heating, whereby a healthy welding condition can be advantageously obtained. In this embodiment, in order to advantageously provide the above-mentioned effects, a length of the projection of the superposed parts 4 from the fixing jigs 6a, 6b is arranged to be sufficiently longer than those in FIGS. 5A-5C.

Each of the grooves 14a, 14b formed in the embodiments in FIG. 5B-5D has a chevron (triangular) shape. The joining operation can be implemented having the deepest or highest position of the groove located on the interface between the metal plates 2a and 2b and between the metal plates 2b and 2c, whereby the above-mentioned advantages can be more favorably exhibited.

In joining together the end portions of the superposed parts 4 of the metal plates 2a-2c along the direction in which the end portions are extending, according to the present invention, it is desirable that the end portions 7 of the superposed parts 4 are preheated before the aforementioned pressing pin 8, pressure roller 12 or pressing spatula 16, as the pressing tool, is caused to contact with or pressed to the end faces 9. According to this arrangement, more effective plastic flow can be promoted, whereby the objects of this invention can be advantageously achieved. As the method of preheating, there is suitably adopted a known method of heating. For instance, there is adopted, for preheating the front of the portions to be joined with respect to the direction of joining the superposed parts 4 (including the end portions), a heating method such as high-frequency induction heating, heating by using an arc or laser, resistance heating, or a controlled atmosphere heat treatment. Also, if there is adopted a continuous welding line according to the present invention, it is also possible to increase the depth of the joint region at the joined portions (end portions) by repeating the joining operation for the end portions according to the present invention, while the extent of pressing the pressing tool to the end portions is gradually increased.

While the presently preferred embodiment of this invention has been described in detail by reference to the drawing, it is to be understood that the invention may be otherwise embodied.

For instance, in the above-described embodiments, the present invention is explained by using examples in which the metal plates 2a-2c, which are plate members, are used as the plurality of members to be joined together. However, the number of the members to be joined together does not have to be limited to two or three. Instead, four or more members can be piled on one another and joined with one another. Moreover, the shape of the members to be joined together does not have to be a plate shape. Instead, there can be adopted any shape of members, as long as overall the each of the parts to be superposed on one another, which is to be subjected to the joining operation according to the present invention, has a plate-like shape.

In addition, there is also suitably selected a pressing load of the pressing pin 8, the pressure roller 12, or the pressing spatula 16 to the end portions 7 of the superposed parts 4, so as to obtain a stable condition of the joint region. Likewise, there are also suitably selected a speed of relative rotation and/or movement between the superposed parts 4 and the pressing tool (8, 12, 16), so as to cause an effective friction heating.

Further, there is suitably selected the pressing pin 8, the pressure roller 12, or the pressing spatula 16 of the pressing tool, which is harder than the plural number of the members to be joined together, considering the material of the members to be joined together. For instance, if the members to be joined together are made of a soft material, such as an aluminum material or a copper material, there is advantageously used the pressing tool made of a steel.

In the illustrated embodiment, the friction heating is caused by the operation of rotation of the pressing tool (8, 12, 16) relative to the superposed parts 4. Instead of or in combination with this method, the friction heating can also be caused by moving, in particular, reciprocating the pressing tool (8, 12, 16) relative to the superposed portions 4.

It is to be understood that the present invention is not limited to the details of the illustrated embodiments, but may be otherwise embodied with various changes, modifications and improvements, which may occur to those skilled in the art, without departing from the scope of the invention.

EXAMPLES

To illustrate the present invention, there will be described some examples of the invention. It is needless to mention that the present invention is not limited to the details of the examples.

Example 1

There were used, as the base materials, aluminum plates (AA6016-T4) which had a thickness of 1 mm and were pressed to form a square hat-shape, in a cross-section, having a width of 200 mm and a length of 300 mm. End portions of flanges of the base materials were piled on each other to form a shape similar to that of folded palms having superposed parts of 5 mm wide. The superposed parts of the flanges were restrained by being sandwiched between steel plates, each of which plates having a thickness of 5 mm.

Thereafter, a cylindrical steel rotary tool having a diameter of 20 mm was rotated on its axis, as shown in FIGS. 1A and 1B, while the rotating circumferential surface of the rotary tool was pressed to the end faces of the superposed parts, so that there was caused a friction heating and a plastic flow at abutting portions of the rotary tool and the end portions, which resulted in joining together the superposed parts of the flanges. In this case, the rotary tool was moved in a longitudinal direction with respect to the flanges at a speed of 1 m/minute, whereby the joining operation was implemented on and along the end portions of the superposed parts.

Thus joined pressed members having a square hat-shape had joined parts along the end portions of their brims, and the joined members had a sufficient strength as a cover for an automotive electric component.

Example 2

There were used aluminum plates (AA3003-H) which had a thickness of 0.4 mm, and one of them was pressed to form a cylindrical hat shape, and the other was formed into a disc having an external diameter of 30 mm. There was also obtained a partition plate made of the same material.

Subsequently, thus obtained cylindrical hat-shaped member and the disc were piled on each other, and the partition plate was inserted therebetween to form a three-layered portion, which has a shape similar to that of a disc sandwiched between folded palms, having superposed parts of 3 mm wide. The superposed parts were fixed by a steel ring and were further attached and fixed to a lathe. The attached members were rotated at a speed of 3000 rpm, while a spatula-shaped steel tool having a width of 1 mm was pressed to the end faces of the superposed parts with a load of 200 kN, as shown in FIG. 4. In this way, the end portions were rubbed while the members were rotated five rounds at a speed of 100 m/minute, whereby there was caused the friction heating and the end portions were joined together.

Thus obtained members, of which the end portions were joined together, were subjected to a pressure test, to be used as a battery case. As a result, there was recognized that the joined parts were fractured, when a load, which was predetermined to avoid a dangerous explosion, was applied.

Example 3

An aluminum round plate (W64C-H14) having a thickness of 0.1 mm was sandwiched between two aluminum round plates (XW861-H14) having a thickness of 0.2 mm, and the three plates were further sandwiched between two aluminum round plates, each of which having a thickness of 1 mm, whereby the piled five round plates, each of which having a diameter of 160 mm, were obtained. In this case, the reference letters "W64C" refer to a commercially available brazing sheet (available from SUMITOMO LIGHT METAL INDUSTRIES, LTD., Japan), which is integrally composed of a core layer made of an aluminum alloy: AA3003 and skin layers made of another aluminum alloy: AA4045, wherein the skin layers are formed on both sides of the core layer. Likewise, the reference letters "WX861" refer to a commercially available brazing sheet (available from SUMITOMO LIGHT METAL INDUSTRIES, LTD., Japan), which is integrally composed of a core layer made of an aluminum alloy: AA3003 and a skin layer made of another aluminum alloy: AA7072, wherein the skin layer is formed on only one side of the core layer. Thus obtained piled five round plates were further sandwiched between steel discs, in a way that peripheral portions of the five round plates were protruded from the steel discs by 0.6 mm, and the five round plates sandwiched between the steel discs were attached to an all-purpose lathe.

Subsequently, the attached plates were rotated at a speed of 640 rpm, as shown in FIG. 4, while an spatula-shaped pressing tool was pressed to the end faces of the protruded peripheral portions of the superposed round plates for 15 seconds at a joining speed of 320 m/minute, in a way that a tip of the pressing tool reached 0.3 mm deep of the protruded peripheral portions, whereby the overlapped round plates were joined together at and along the peripheral (end) portions of the plates.

Figure 6:
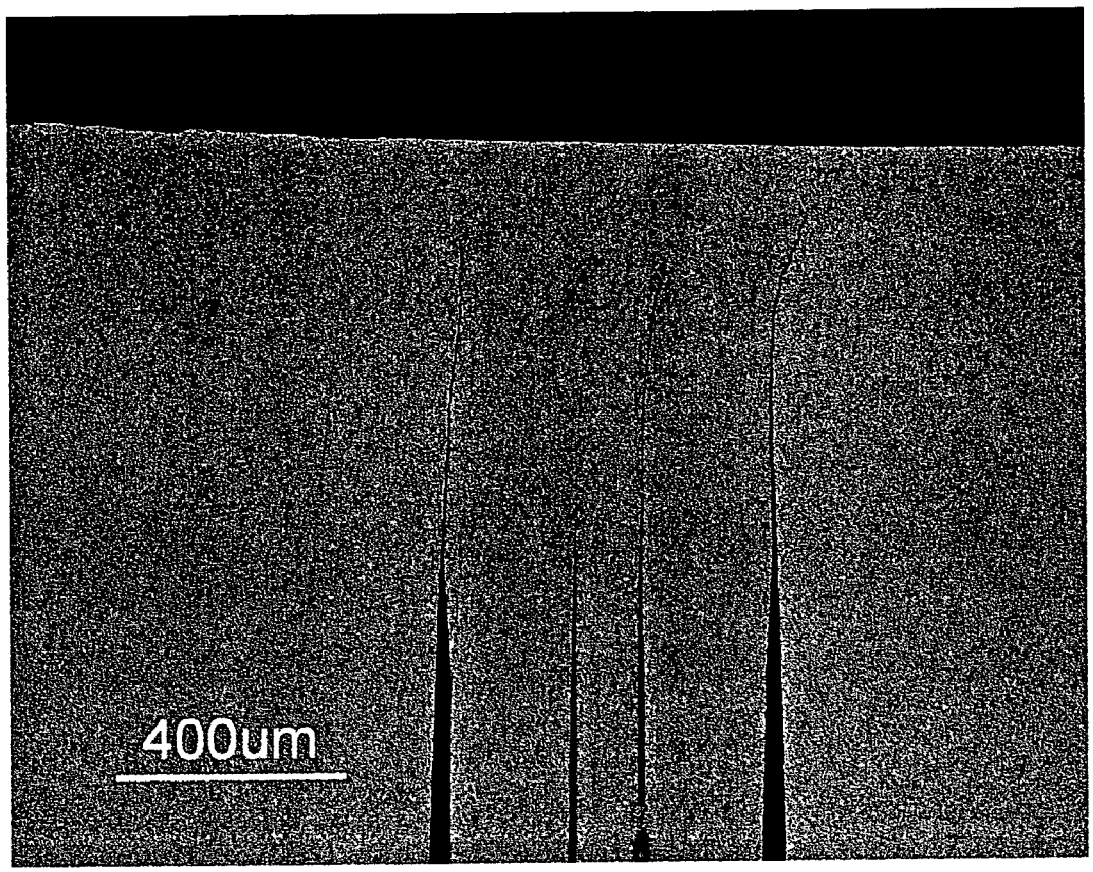
FIG. 6 is a photograph showing a cross-sectional enlarged view of a formation of superposed parts, which are joined at the end portions thereof and obtained in the Example 3.

In FIG. 6, there is shown a photograph of a cross-sectional enlarged view of a formation of thus obtained joined members, of which the peripheral (end) portions are joined together. As it is apparent from FIG. 6, the peripheral (end) surface of the joined members has an integral structure, and there was recognized that this structure is obtained as a result of the plastic flow of the materials of the members caused by the above-mentioned joining operation.

What is claimed is:
1. A method of joining a plurality of members to one another, comprising:
  providing a plurality of members each having a planar shape with opposed major surfaces and a terminal edge extending between said major surfaces;
  piling the plurality of members on one another so that opposed major surfaces of adjacent members contact one another to form a stack so that the terminal edges of the members are superposed and are all oriented in the same direction;

restraining the members from both sides thereof;

providing a tool having a pressure roller that is harder than the members and having an axis of rotation that is arranged parallel to the axis of the stack;

rotating the pressure roller about its axis of rotation and pressing, at an area of contact, a circumference of the pressure roller against the terminal edges of the superposed members so that the terminal edges of the superposed members are rubbed to cause friction heating which leads to cause a plastic flow, wherein at said area of contact, the terminal edges of the superposed members are pressed by said circumference of the pressure roller and moved in a relative direction that is directly opposite to the direction in which the pressure roller is rotating, and wherein said pressing of said circumference of the pressure roller and said movement of the pressure roller in a relative direction that is directly opposite to said rotational direction of the pressure roller at said area of contact along the terminal edges of the superposed members rubs and joins the plurality of superposed members together at substantially only the terminal edges thereof.

2. The method according to claim 1,
wherein the superposed members are restrained by being sandwiched between joining jigs in a direction, in which the superposed members are piled on one another, while the superposed members are projected from both sides of the joining jigs, and the members are joined together at the terminal edges of the projected superposed members.

3. The method according to claim 1,
wherein at least one first groove is provided on a contacting surface of the tool,
said contacting surface is opposed to the terminal edges of the superposed members, so that said at least one groove is located on a position corresponding to at least one interface between the superposed members, extending along the terminal edges.

4. The method according to claim 3,
wherein a second groove, which has an opening, whose width is larger than a thickness of the superposed members, is provided on the contacting surface of the tool,
said contacting surface is opposed to the terminal edges of the superposed members, so that the second groove is extending along the terminal edges, and
the terminal edges of the superposed members are accommodated in the groove, whereby the friction heating is caused.

5. The method according to claim 1,
wherein the thickness of the superposed members to be joined together is not more than 3 mm.

6. The method according to claim 1,
wherein the thickness of each of the superposed members to be joined together is not more than 1 mm.

7. The method according to claim 1,
wherein the terminal edges of the superposed members are preheated, before the terminal edges are caused to contact with the tool.

8. A method of joining a plurality of members to one another, comprising:
providing at least three members each having a planar shape with opposed major surfaces and a terminal edge extending between said major surfaces;
piling the plurality of members on one another to form a stack so that the terminal edges of the members are superposed and are all oriented in the same direction;
restraining the members from both sides thereof;
providing a tool having a pressure roller that is harder than the members and having an axis of rotation that is arranged parallel to the axis of the stack;
rotating the pressure roller about its axis of rotation and pressing, at an area of contact, a circumference of the pressure roller against the terminal edges of the superposed members so that the terminal edges of the superposed members are rubbed by said tool to cause friction heating which leads to cause a plastic flow,
wherein at said area of contact, the terminal edges of the superposed members are pressed by said circumference of the pressure roller and moved in a relative direction that is directly opposite to the direction in which the pressure roller is rotating, and
wherein said pressing of said circumference of the pressure roller and said movement of the pressure roller in a relative direction that is directly opposite to said rotational direction of the pressure roller at said area of contact along the terminal edges of the superposed members rubs and simultaneously joins the plurality of superposed members together at substantially only the terminal edges thereof.

9. A method of joining a plurality of members to one another, comprising:
providing a plurality of members each having a planar shape with opposed major surfaces and a terminating end edge extending between said major surfaces;
piling the plurality of members on one another so that opposed major surfaces of adjacent members contact one another to form a superposed stack so that the entirety of all said terminating end edges of the members substantially coincide and are all facing in the same direction;
restraining the members from both sides thereof;
providing a tool having a pressure roller that is harder than the members and having an axis of rotation that is arranged parallel to the axis of the stack;
rotating the pressure roller about its axis of rotation and pressing, at an area of contact, a circumference of the pressure roller against said terminating end edges of the superposed members so that said terminating end edges of the superposed members are rubbed to cause friction heating which leads to cause a plastic flow,
wherein at said area of contact, said terminating end edges of the superposed members are pressed by said circumference of the pressure roller and moved in a relative direction that is directly opposite to the direction in which the pressure roller is rotating, and
wherein said pressing of said circumference of the pressure roller and said movement of the pressure roller in a relative direction that is directly opposite to said rotational direction of the pressure roller at said area of contact along said terminating end edges of the superposed members rubs and joins the plurality of superposed members together at substantially only said terminating end edges of the members.

10. The method according to claim 1,
wherein said circumference of the pressure roller that is pressed against the terminal edges of the superposed members defines a central contacting portion of the tool, and the tool includes two shoulder extremity portions that extend directly from opposite axial ends of the central contacting portion of the tool, and
wherein the diameter of said central contacting portion is larger than the diameters of the shoulder extremity portions, and only the central contacting portion contacts the terminal edges of the superposed members.

\* \* \* \* \*